US012656531B2

(12) United States Patent
Burger et al.

(10) Patent No.: US 12,656,531 B2
(45) Date of Patent: Jun. 16, 2026

(54) POLYFLUOROAROMATIC DERIVATIVES FOR LIQUID LENSES

(71) Applicant: CORNING INCORPORATED, Corning, NY (US)

(72) Inventors: Benjamin Jean-Baptiste Francois Burger, Lyons (FR); Patrick Jean, Fontainebleau (FR)

(73) Assignee: CORNING INCORPORATED, Corning, NY (US)

(*) Notice: Subject to any disclaimer, the term of this patent is extended or adjusted under 35 U.S.C. 154(b) by 198 days.

(21) Appl. No.: 18/446,100

(22) Filed: Aug. 8, 2023

(65) Prior Publication Data

US 2024/0069245 A1 Feb. 29, 2024

Related U.S. Application Data

(60) Provisional application No. 63/397,417, filed on Aug. 12, 2022.

(51) Int. Cl.

| | |
|---|---|
| ***G02B 1/06*** | (2006.01) |
| ***G02B 1/04*** | (2006.01) |
| ***G02B 3/14*** | (2006.01) |

(52) U.S. Cl.
CPC ............... *G02B 1/041* (2013.01); *G02B 3/14* (2013.01)

(58) Field of Classification Search
CPC .......... G02B 1/06; G02B 3/14; G02B 26/004; G02B 26/005
See application file for complete search history.

(56) References Cited

U.S. PATENT DOCUMENTS

| | | | |
|---|---|---|---|
| 7,729,057 | B2 | 6/2010 | Maillard et al. |
| 7,780,874 | B2 | 8/2010 | Liogier et al. |

(Continued)

FOREIGN PATENT DOCUMENTS

| | | | |
|---|---|---|---|
| EP | 2947496 | A1 | 11/2015 |
| EP | 2102650 | B1 | 5/2021 |

(Continued)

OTHER PUBLICATIONS

Ober et al., "Development of Biphasic Formulations for Use in Electrowetting-Based Liquid Lenses With a High Refractive Index Difference", ACS Comb. Sci. 2018, vol. 20, No. 9, 554-566.

(Continued)

*Primary Examiner* — Joseph P Martinez
(74) *Attorney, Agent, or Firm* — Kevin L. Bray; Yiqun Zhao; Ye Eun Park

(57) ABSTRACT

A liquid lens including a first liquid comprising a polyfluoroaromatic compound represented by formula (I): $F_x$-(aromatic)-Y—$R_1$. "x" is within a range of from 2 to 5. Y is one of $CH_2$, $Si(Alk)_2$, $Ge(Alk)_2$, O, and S. "Alk" is a linear aliphatic chain. $R_1$ is any organic group, but can be one of a linear aliphatic chain, a cycloaliphatic, a fluorocycloaliphatic, and an aromatic residue. "Aromatic" is any six carbon aromatic ring. Examples of the chemical compound represented by formula (I) include butylpentafluorobenzene; dimethylnonafluorohexylpentafluorophenylsilane; trimethylpentafluorophenylgennane; butoxypentafluorobenzene; cyclopentoxypentafluorobenzene; 1-n-octyloxypentafluorobenzene; cyclooctyloxypentafluorobenzene; 1-n-dodecyloxypentafluorobenzene; cyclopentylpentafluorophenylsulfide; phenoxypentafluorobenzene; 2,4-difluoroanisole; and heptafluoropentyloxypentafluorobenzene. The first liquid has a density in a range of from 0.95 g/mL to 1.35 g/mL (at 20° C.). The liquid lens further includes a second liquid that (Continued)

forms an interface with the first liquid. The second liquid can be substantially free of water.

18 Claims, 2 Drawing Sheets

(56) References Cited

U.S. PATENT DOCUMENTS

| | | | | |
|---|---|---|---|---|
| 8,691,147 | B2 | 4/2014 | Leek et al. | |
| 9,164,272 | B2 | 10/2015 | Maillard et al. | |
| 10,558,031 | B2 | 2/2020 | Burger et al. | |
| 2006/0215273 | A1 * | 9/2006 | Kuiper | G02B 3/14 359/666 |
| 2007/0058094 | A1 | 3/2007 | Kuiper et al. | |
| 2015/0338637 | A1 | 11/2015 | Burger et al. | |
| 2020/0032142 | A1 * | 1/2020 | Chang | C09K 19/3059 |
| 2022/0099862 | A1 | 3/2022 | Burger | |
| 2024/0069245 | A1 * | 2/2024 | Burger | G02B 3/14 |

FOREIGN PATENT DOCUMENTS

| | | | |
|---|---|---|---|
| WO | 2020/002339 | A1 | 1/2020 |
| WO | 2020/159781 | A1 | 8/2020 |

OTHER PUBLICATIONS

"Product specification (pentafluorophenyl)triethoxysilane", Retrieved from the Internet: URL:https://www.sigmaaldrich.com/specification-sheets/422/638/592757-BULK ALDRICH_.pdf, 2023, 1 page.

International Search Report and Written Opinion of the International Searching Authority; PCT/US2023/029685; dated Nov. 15, 2023; 12 pages; European Patent Office.

* cited by examiner

POLYFLUOROAROMATIC DERIVATIVES FOR LIQUID LENSES

CROSS-REFERENCE TO RELATED APPLICATIONS

This application claims the benefit of priority of U.S. Provisional Application Ser. No. 63/397,417 filed on Aug. 12, 2022, the content of which is relied upon and incorporated herein by reference in its entirety.

FIELD OF THE DISCLOSURE

The present disclosure generally relates to electrowetting based liquid lenses, and more particularly, to a non-conductive liquid for a liquid lens that includes a polyfluoroaromatic compound.

BACKGROUND

A transmissive liquid lens generally encloses two immiscible liquids, one polar, also referred to as conducting, and one non-conductive, also referred to as insulating and/or non-polar, within a body or housing. The housing incorporates electrodes by which a shape of an interface between the two immiscible liquids may be manipulated based on the principles of electrowetting. Typically, the two liquids have approximately the same density but different indices of refraction.

Typically, the non-conductive liquid is a mixture of substances, because a single substance alone does not have the desired combination of properties such as density or index of refraction. Heretofore, organogermane compounds and perfluorinated alkanes have been utilized as components of the non-conductive liquid. However, these substances present problems. For example, organogermane compounds are relatively expensive, which increases the cost of the liquid lens. Further, perfluorinated alkanes have limited miscibility with other substances that may be desirable to collectively form the non-conductive liquid with the desired properties.

SUMMARY

The present disclosure addresses those problems with a non-conductive liquid that includes a polyfluoroaromatic compound represented by formula (I) below $$F_x\text{-(aromatic)-Y—R}_1 \quad (I)$$

where x is within a range of from 2 to 5; where Y is chosen from the group consisting of $CH_2$, $Si(Alk)_2$, $Ge(Alk)_2$, O, and S, where "Alk" is a linear aliphatic chain, where $R_1$ is any organic group, and where "aromatic" is any six carbon aromatic ring. The polyfluoroaromatic compound of formula (I) above is relatively inexpensive to formulate, has a tunable density and index of refraction, has desirable miscibility with other desirable substances that could form the non-conductive liquid, has a tunable non-miscibility with the conductive liquid, and has a high hydrolytic stability.

According to a first aspect of the present disclosure, a liquid lens comprises: a first liquid comprising a polyfluoroaromatic compound represented by formula (I)

$$F_x\text{-(aromatic)-Y—R}_1 \quad (I)$$

where x is within a range of from 2 to 5; where Y is any organic or inorganic fragment; where $R_1$ is any organic group; and "aromatic" is any six carbon aromatic ring; wherein, the liquid lens exhibits a hysteresis that increases from an initial hysteresis by 1 diopter or less after being stored at 85° C. for at least 120 hours.

According to a second aspect of the present disclosure, the liquid lens of the first aspect is presented, wherein Y is chosen from the group consisting of $CH_2$, $Si(Alk)_2$, $Ge(Alk)_2$, O, and S, where "Alk" is a linear aliphatic chain.

According to a third aspect of the present disclosure, the liquid lens of any one of the first through second aspects is presented, wherein $R_1$ is chosen from the group consisting of a linear aliphatic chain, a cycloaliphatic, a fluorocycloaliphatic, and an aromatic residue.

According to fourth aspect of the present disclosure, the liquid lens of any one of the first through third aspects is presented, wherein the $F_x$-(aromatic) portion of formula (I) is a fluorobenzene ring.

According to a fifth aspect of the present disclosure, the liquid lens of any one of the first through third aspects is presented, wherein the $F_x$-(aromatic) portion of formula (I) is a pentafluorobenzene ring including five fluorine substituents.

According to a sixth aspect of the present disclosure, the liquid lens of the first aspect is presented, wherein the polyfluoroaromatic compound is represented by formula (II) below

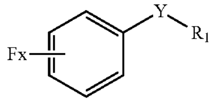

(II)

where x is within a range of from 2 to 5; where Y is chosen from the group consisting of $CH_2$, $Si(Alk)_2$, $Ge(Alk)_2$, O, and S, where "alk" is a linear aliphatic chain; and where $R_1$ is chosen from the group consisting of a linear aliphatic chain, a cycloaliphatic, a fluorocycloaliphatic, and an aromatic residue.

According to an seventh aspect of the present disclosure, the liquid lens of the first aspect is presented, wherein the polyfluoroaromatic compound is represented by formula (III) below

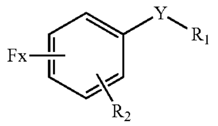

(III)

where x is within a range of from 2 to 4; where Y is any organic or inorganic fragment;
where $R_1$ is any organic group; and where $R_2$ is any organic group.

According to an eighth aspect of the present disclosure, the liquid lens of any one of the first through seventh aspects further comprises a second liquid, wherein the first liquid and the second liquid (i) form an interface between the first liquid and the second liquid and (ii) comprise a miscibility of less than 2% over a temperature range of from −30° C. to 85° C.; and wherein the first liquid comprises a density in a range of from 0.95 g/mL to 1.35 g/mL (at 20° C.).

According to a ninth aspect of the present disclosure, the liquid lens of the eighth aspect is presented, wherein the second liquid is substantially free of water.

According to a tenth aspect of the present disclosure, a liquid lens comprises: (a) a first liquid comprising a polyfluoroaromatic compound represented by formula (I) below $F_x$-(aromatic)-Y—$R_1$ (I)

where x is within a range of from 2 to 5; where $Y_1$ is chosen from the group consisting of $CH_2$, $Si(Alk)_2$, $Ge(Alk)_2$, O, and S, where "Alk" is a linear aliphatic chain; where R is any organic group, and "aromatic" is any six carbon aromatic ring; and (b) a second liquid, wherein the first liquid and the second liquid (i) form an interface between the first liquid and the second liquid, (ii) comprise a miscibility of less than 2% over a temperature range of from −30° C. to 85° C., and (iii) each comprise a density, the densities differing by less than 0.1 g/mL.

According to an eleventh aspect of the present disclosure, the liquid lens of the tenth aspect is presented, wherein $R_1$ is chosen from the group consisting of a linear aliphatic chain, a cycloaliphatic, a fluorocycloaliphatic, and an aromatic residue.

According to a twelfth aspect of the present disclosure, the liquid lens of any one of the tenth through eleventh aspects is presented, wherein the $F_x$-(aromatic) portion of formula (I) is a fluorobenzene ring.

According to a thirteenth aspect of the present disclosure, the liquid lens of any one of the tenth through eleventh aspect is presented, wherein the $F_x$-(aromatic) portion of formula (I) is a pentafluorobenzene ring including five fluorine substituents.

According to a fourteenth aspect of the present disclosure, the liquid lens of the tenth aspect is presented, wherein the polyfluoroaromatic compound is represented by formula (II) below (II)

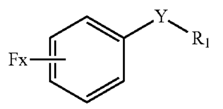

where x is within a range of from 2 to 5; where Y is chosen from the group consisting of $CH_2$, $Si(Alk)_2$, $Ge(Alk)_2$, O, and S, where "alk" is a linear aliphatic chain; and where $R_1$ is chosen from the group consisting of a linear aliphatic chain, a cycloaliphatic, a fluorocycloaliphatic, and an aromatic residue.

According to a fifteenth aspect of the present disclosure, the liquid lens of any of the tenth and fourteenth aspects is presented, wherein the polyfluoroaromatic compound is chosen from the group consisting of:

butylpentafluorobenzene;
dimethylnonafluorohexylpentafluorophenylsilane;
trimethylpentafluorophenylgermane;
butoxypentafluorobenzene;
cyclopentoxypentafluorobenzene;
1-n-octyloxypentafluorobenzene;
cyclooctyloxypentafluorobenzene;
1-n-dodecyloxypentafluorobenzene;
cyclopentylpentafluorophenylsulfide;
phenoxypentafluorobenzene;
2,4-difluoroanisole; and
heptafluoropentyloxypentafluorobenzene.

According to a sixteenth aspect of the present disclosure, the liquid lens of the tenth aspect is presented, wherein the polyfluoroaromatic compound is represented by formula (III) below (III)

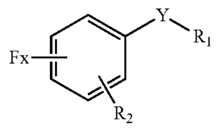

where x is within a range of from 2 to 4; where Y is any organic or inorganic fragment;

where $R_1$ is any organic group; and where $R_2$ is any organic group.

According to a seventeenth aspect of the present disclosure, the liquid lens of any one of the tenth through sixteenth aspects is presented, wherein (i) the first liquid comprises a density in a range of from 0.95 g/mL to 1.35 g/mL (at 20° C.); and (ii) the second liquid is water-based, glycol-based, or ionic liquid-based.

According to an eighteenth aspect of the present disclosure, the liquid lens of any one of the tenth through the sixteenth aspects is presented, wherein the second liquid is substantially free of water.

According to a nineteenth aspect of the present disclosure, a method of manufacturing a liquid lens comprises: (A) disposing a first liquid into a base, the first liquid comprising a polyfluoroaromatic compound represented by formula (I) below $F_x$-(aromatic)-Y—$R_1$ (I)

where x is within a range of from 2 to 5; where Y is chosen from the group consisting of $CH_2$, $Si(Alk)_2$, $Ge(Alk)_2$, O, and S, where "Alk" is a linear aliphatic chain; where $R_1$ is any organic group, and "aromatic" is any six carbon aromatic ring; and (B) disposing a second liquid into the base, wherein (a) the first liquid and the second liquid (i) form an interface between the first liquid and the second liquid and (ii) comprise a miscibility of less than 2% over a temperature range of from −30° C. to 85° C., (b) the first liquid comprises a density in a range of from 0.95 g/mL to 1.35 g/mL (at 20° C.), (c) a difference between the density of the first liquid and a density of the second liquid is less than 0.1 g/mL, and (d) a difference between a refractive index of the first liquid and a refractive index of the second liquid is in a range of from 0.02 to 0.24.

According to a twentieth aspect of the present disclosure, the method of the nineteenth aspect is presented, wherein (a) the $F_x$-(aromatic) portion of formula (I) is a fluorobenzene ring, and (b) the second liquid is substantially free of water.

According to a twenty-first aspect of the present disclosure, the liquid lens of any one of the first, sixth, eighth, and ninth aspects is presented, wherein the polyfluoroaromatic compound is chosen from the group consisting of:

butylpentafluorobenzene;
dimethylnonafluorohexylpentafluorophenylsilane;
trimethylpentafluorophenylgermane;
butoxypentafluorobenzene;
cyclopentoxypentafluorobenzene;
1-n-octyloxypentafluorobenzene;
cyclooctyloxypentafluorobenzene;
1-n-dodecyloxypentafluorobenzene;
cyclopentylpentafluorophenylsulfide;
phenoxypentafluorobenzene;
2,4-difluoroanisole; and
heptafluoropentyloxypentafluorobenzene.

According to a twenty-second aspect of the present disclosure, the method of any one of the nineteenth through twentieth aspects is presented, wherein the polyfluoroaromatic compound is chosen from the group consisting of:

butylpentafluorobenzene;
dimethylnonafluorohexylpentafluorophenylsilane;
trimethylpentafluorophenylgermane;
butoxypentafluorobenzene;
cyclopentoxypentafluorobenzene;
1-n-octyloxypentafluorobenzene;
cyclooctyloxypentafluorobenzene;
1-n-dodecyloxypentafluorobenzene;
cyclopentylpentafluorophenylsulfide;
phenoxypentafluorobenzene;
2,4-difluoroanisole; and
heptafluoropentyloxypentafluorobenzene.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate one or more embodiments, and together with the description, serve to explain principles and operation of the various embodiments.

DETAILED DESCRIPTION

Figure 1:
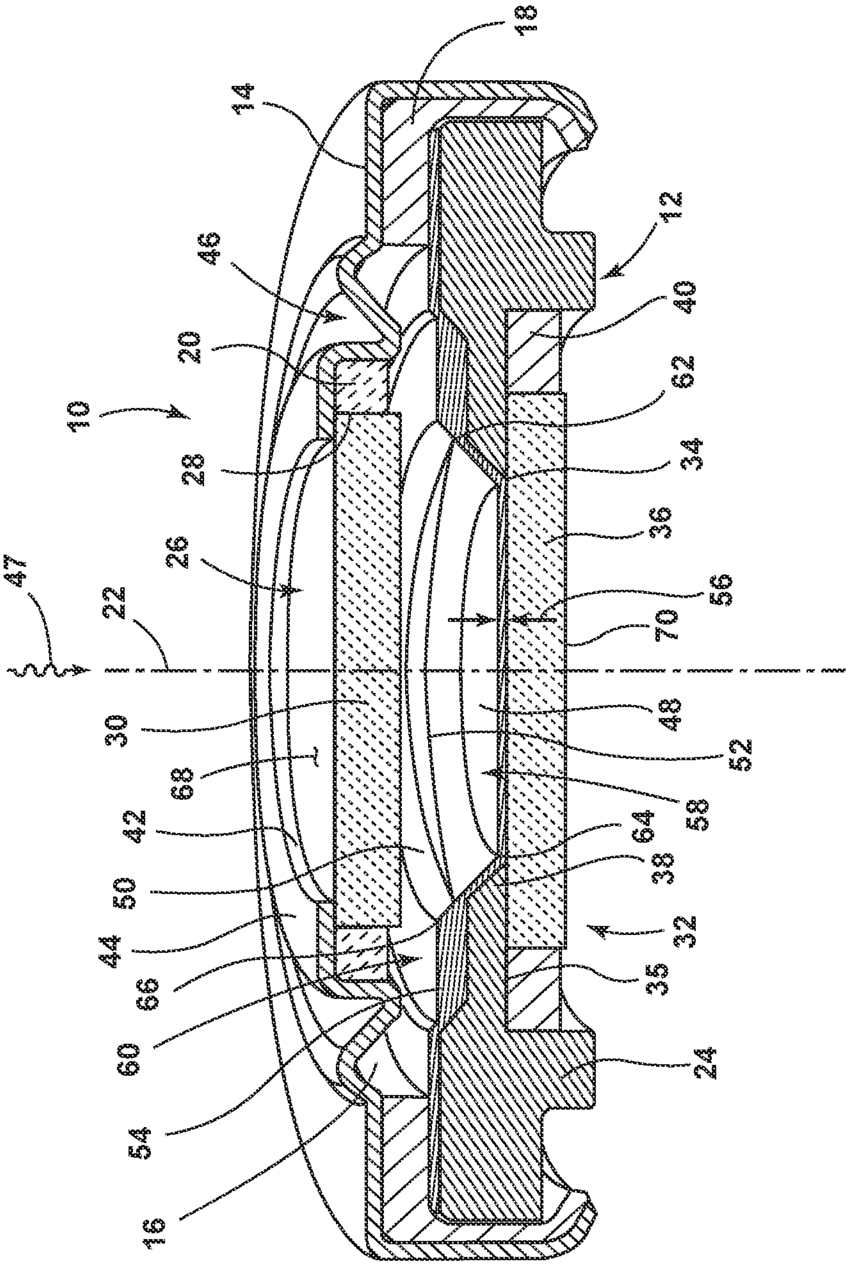
FIG. 1 is a schematic cross-sectional view of embodiments of a liquid lens according to various aspects of the present disclosure, illustrating a first liquid and a second liquid separated by an interface.

Reference will now be made in detail to the present preferred embodiments, examples of which are illustrated in the accompanying drawings. Whenever possible, the same reference numerals will be used throughout the drawings to refer to the same or like parts.

Figure 2:
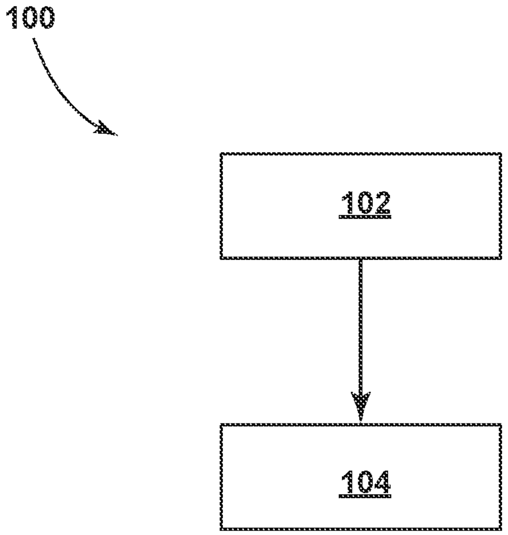
FIG. 2 is a flow chart of a method of manufacturing a liquid lens, such as the liquid lens of FIG. 1.

It is to be understood that the disclosure may assume various orientations and step sequences alternative to those illustrated at FIGS. 1 and 2, except where expressly specified to the contrary. It is also to be understood that the specific disclosures illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Liquid Lens 10

Referring now to FIG. 1, in embodiments, a liquid lens 10 includes a base 12 and a cap 14. The base 12 and the cap 14 can be mounted relative to one another to facilitate maintenance of a fluid-tight containment region 16 to provide electrical insulation between the base 12 and the cap 14. A gasket 18 may be disposed between the base 12 and the cap 14 to facilitate maintenance of the fluid-tight containment region 16.

The liquid lens 10 includes a first electrode 20, an optical axis 22, and a second electrode 24. In embodiments, the liquid lens 10 is rotationally symmetric about the optical axis 22. The first electrode 20 and/or the second electrode 24 may comprise a conductor. In embodiments, the first electrode 20 and/or the second electrode 24 include a metal, such as one or more of copper, silver, gold, platinum, aluminum, chromium, titanium, nickel, steel, bronze, and/or brass. In embodiments, the first electrode 20 and/or the second electrode 24 include a conductive polymer, such as one or more of poly(3,4,-ethylenedioxythiophene) (PEDOT), polyphenylsulfide (PSS), PEDOT:PSS, poly-p-phenylene(PpP), polythiophene (PTh), polyanilines (PANI), polypyrrole (PPy), polythalocyanine (PPhc), or polyisothianaphtalene (PITN). In embodiments, the first electrode 20 and/or the second electrode 24 include a material that is transparent over a desired operating wavelength range of the liquid lens 10. In embodiments, the second electrode 24 includes one or more of PEDOT, PEDOT:PSS, aluminum oxide, cadmium oxide, gallium oxide, tin oxide (e.g., indium tin oxide (ITO)), and zinc oxide. In embodiments, the first electrode 20 and/or the second electrode 24 are doped with one or more transition metals and/or Group IIIA metals (e.g., aluminum, gallium indium, thallium). In embodiments, the first electrode 20 and/or the second electrode 24 include an intrinsically conductive polymer (e.g., the bulk of the polymer is conductive). In embodiments, the first electrode 20 and/or the second electrode 24 include a polymer composite with nanoparticles and/or carbon fiber.

In embodiments, the first electrode 20 circumscribes a first window 26 via a through aperture 28. In embodiments, the first window 26 further includes a first substrate 30. In embodiments, the first substrate 30 is mounted relative to the through aperture 28. In embodiments, the first substrate 30 is mounted entirely within the through aperture 28 of the first electrode 20, with the first electrode 20 entirely circumscribing the first substrate 30.

In embodiments, the second electrode 24 at least partially circumscribes a second window 32 via a through aperture 34 of the second electrode 24. In embodiments, the through aperture 34 of the second electrode 24 has a cross-sectional diameter in a direction perpendicular to the optical axis 22 that is stepped to define a seat 35. In embodiments, the second window 32 further includes a second substrate 36. In embodiments, the second substrate 36 is mounted relative to the corresponding through aperture 34. In embodiments, a portion 38 of the second electrode 24 extends over an outer circumferential portion of one or both major surfaces of the second substrate 36.

In embodiments, the second substrate 36 is mounted by a fitting 40 to the seat 35 of the through aperture 34. Furthermore, in embodiments, the base 12 includes the second electrode 24, the second window 32, and the fitting 40. In such embodiments, the gasket 18 provides a fluid seal between the second electrode 24 of the base 12 and the cap 14 to facilitate maintenance of the fluid-tight containment region 16.

In embodiments, the cap 14 includes or supports the first electrode 20 and the first window 26. In embodiments, the cap 14 defines an effective through aperture 42 that is smaller than a diameter of through aperture 28 of the first electrode 20, wherein a lip 44 extends over the outer surface of the first electrode 20 and over an outer peripheral portion of the first window 26 to protect the first electrode 20 and the interface between the first substrate 30 and the first electrode 20 from external forces and environmental conditions. Furthermore, the lip 44 extends over an outer peripheral surface of the first electrode 20 to further help protect the first electrode 20 from external forces and environmental conditions as well as help seat the first electrode 20 within a reception area of the cap 14. In embodiments, the cap 14 has a shape that is rotationally symmetric about the optical axis 22. In embodiments, as shown, the cap 14 has a substantially "S" shaped portion 46 that has bent portions with one bent portion having an opening facing the fluid-tight containment region 16 and another bent portion having an opening facing away from the fluid-tight containment region 16. The substantially "S" shaped portion 46 may allow some movement of the first substrate 30*a* along the optical axis 22 when pressure is exerted by fluids (introduced further below) inside the fluid-tight containment region 16 of the liquid lens 10 and/or when pressure is externally exerted on the cap 14 of the liquid lens 10.

The optical axis 22 intersects both the first window 26 and the second window 32. In embodiments, as shown, the optical axis 22 passes through the center of volume of both the first substrate 30 and the second substrate 36. In embodiments, second window 32 is aligned with the first window 26 along the optical axis 22.

In embodiments, transmittance of incident electromagnetic radiation 47 of the desired wavelength range through the first window 26 and the second window 32 into the fluid-tight containment region 16 or out of the fluid-tight containment region 16 is about 85% or more. In embodiments, the first substrate 30 and the second substrate 36 each have an average transmission over an operating wavelength range of the incident electromagnetic radiation 46 of about 85% or greater, about 88% or greater, about 90% or greater, about 92% or greater, about 94% or greater, about 96% or greater, about 98% or greater, or about 99% or greater. As used herein, transmittance refers to an arithmetic average (e.g., mean) percentage of incident intensity of the electromagnetic radiation 46 transmitted through a material or a device over the operating wavelength range. In embodiments, the operating wavelength range may be over visible optical wavelengths. In embodiments, the operating wavelength range may be over a range of wavelengths from about 400 nanometers (nm) to 700 nm, from about 400 nm to about 550 nm, from about 550 nm to about 700 nm, from about 600 nm to about 700 nm, or any range or subrange therebetween. In some embodiments, the operating wavelength range may include infrared wavelengths, such as including a range of wavelengths from about 700 nm to about 1,000 micrometers (μm). In embodiments, the operating wavelength range may include a range of ultraviolet wavelengths, such as including a range of wavelengths from about 10 nm to about 400 nm.

The first substrate 30 and/or the second substrate 36 can comprise a polymer, a crystalline material (e.g., quartz, sapphire, single crystal or polycrystalline alumina, spinel ($MgAl_2O_4$)), a glass-based material, or combinations thereof. Examples of suitable polymers comprise, without limitation, the following including copolymers and blends thereof: thermoplastics including polystyrene (PS), polycarbonate (PC), polyesters including polyethyleneterephthalate (PET), polyolefins including polyethylene (PE), acrylic polymers including polymethyl methacrylate (PMMA), epoxies, and silicones including polydimethylsiloxane (PDMS). As used herein, "glass-based" includes both glasses and glass-ceramics, wherein glass-ceramics have one or more crystalline phases and an amorphous, residual glass phase. A glass-based material may comprise an amorphous material (e.g., glass) and optionally one or more crystalline materials (e.g., ceramic). Exemplary glass-based materials, which may be free of lithia or not, include soda lime glass, alkali aluminosilicate glass, alkali containing borosilicate glass, alkali aluminophosphosilicate glass, and alkali aluminoborosilicate glass.

The liquid lens 10 further includes a first liquid 48 and a second liquid 50 disposed within the fluid-tight containment region 16. An interface 52 is formed between the first liquid 48 and the second liquid 50. For example, in embodiments, the first liquid 48 and the second liquid 50 are immiscible. As used herein, the terms "non-miscible" and "immiscible" refer to liquids that do not form a homogeneous mixture when added together or liquids which minimally mix when the one liquid is added into the other. In some examples, two liquids are considered non-miscible when their partial miscibility is below 2%, below 1%, below 0.5%, or below 0.2%, all values being measured within a given temperature range (e.g. at 20° C.). A low mutual miscibility may be preferred over exemplary temperature ranges of −30° C. to 85° C., or from −20° C. to 65° C.

In embodiments, although not shown, the interface 52 can be a transparent membrane that separates the first liquid 48 from the second liquid 50. In any event, the interface 52 forms a lens. In embodiments, the first liquid 48 and the second liquid 50 have substantially the same density, which can help to avoid changes in the shape of the interface 52 as a result of changing the physical orientation of the liquid lens 10 (e.g., as a result of gravitational forces). Thus, in some examples, a difference between a density of the first liquid 48 and a density of the second liquid 50 is less than 0.1 g/mL (e.g., within a range of from 0.00 g/mL to 0.09 g/mL).

In embodiments, the first liquid 48 has a refractive index that is greater than a refractive index of the second liquid 50. In embodiments, the refractive index of the first liquid 48 is less than the refractive index of the second liquid 50. In embodiments, a difference between the refractive index of the first liquid 48 and the refractive index of the second liquid 50 is within a range of from 0.02 to 0.24. The optical axis 22 passes through the interface 52.

In embodiments, the second liquid 50 is a conductive liquid. In embodiments, the second liquid 50 is a polar liquid. In embodiments, the second liquid 50 is water-based, glycol-based, or ionic liquid-based. Examples of appropriate liquids for the second liquid 50 include alcohols (e.g., methanol, propanediols), glycols (e.g., ethylene glycol, propylene glycol, trimethylene glycol), ionic liquids (e.g., lithium carbonate, 1-ethyl-3-methylimidazolium-based, 1-alkylpyridinium-based, 1-butyl-3-methylimidazolium tetrafluoroborate-based, N-methyl-N-alkylpyrrolidinium-based liquids), inorganic ionic solutions (e.g., sodium phosphate, sodium bromide, sodium chloride, calcium chloride, lithium chloride, ammonium carbonate, ammonium tetrafluoroboratepotassium nitrate), organic ionic solutions (e.g., potassium acetate, acetic acid, succinic acid, iminodiacetic acid (IDA), nitrilotriacetic acid (NTA), ethylenediaminetetraacetic acid (EDTA), diethylene triamine pentaaectic acid (DTPA), ethylene glycol tetraacetic acid (EGTA), 1,2-bis(o-aminophenoxy)ethane-N,N,-N'N'-tetraacetic acid (BAPTA), 2,2'2"-(1,4,7,-triazonane-1,4,7,-triyl)triacetic acid (NOTA), 1,4,7,10-tetranzacyclododecane-1,4,7,10-tetraacetic acid (DOTA)), and combinations thereof (e.g., 0.1 w/w potassium acetate in ethylene glycol).

As used herein, the term "conductive liquid" refers to a liquid having a conductivity in ranges of from approximately $1\times10^{-3}$ Siemens per meter (S/m) to approximately $1\times10^{2}$ S/m, from approximately 0.1 S/m to approximately 10 S/m, or from approximately 0.1 S/m to approximately 1 S/m. In embodiments, the second liquid 50 is substantially free of water, meaning that water is not intentionally present in the second liquid 50 and, if inadvertently present, comprises less than 0.1 wt % of the second liquid.

In embodiments, the second liquid 50 has a density of 0.95 g/mL, 1.00 g/mL, 1.05 g/mL, 1.10 g/mL, 1.15 g/mL, 1.20 g/mL, 1.25 g/mL, 1.30 g/mL, or 1.35 g/mL, or within any range bound by any two of those values (e.g., from 0.95 g/mL to 1.35 g/mL, 1.10 g/mL to 1.30 g/mL, and so on).

The liquid lens 10 further includes an insulating layer 54. The insulating layer 54 covers the second window 32, the through aperture 34, and the second electrode 24 from the point of view of the containment region 16. The insulating layer 54 covers the portion of the second substrate 36 that the second electrode 24 does not cover. The insulating layer 54 has a thickness 56. In embodiments, the thickness of the insulating layer 54 varies as a function of distance from the optical axis 22. The first electrode 20 is in electrical communication with the second liquid 50. The insulating layer 54 insulates the first liquid 48 and the second liquid 50 from the second electrode 24. In embodiments, the insulating layer 54 is sufficiently transparent to enable passage of the electromagnetic radiation 46 desired to be sensed through the second window 32 as described herein.

In embodiments, the containment region 16 includes a first portion 58 (or base portion) and a second portion 60 (or headspace). In embodiments, at least a portion of the first liquid 48 is disposed in the first portion 58 of the containment region 16, while at least a portion of the second liquid 50 is disposed within the second portion 60 of the containment region 16. In embodiments, substantially all of the first liquid 48 is disposed within the first portion 58 of the containment region 16. In embodiments, a perimeter 62 of the interface 52 (e.g., the edge of the interface 52 in contact with insulating layer 54) is disposed within the first portion 58 of the containment region 16.

In embodiments, the containment region 16 (e.g., the first portion 58 of the containment region 16) is tapered as shown in FIG. 1 such that a cross-sectional area of the containment region 16 decreases along the optical axis 22 in a direction from the first window 26 to the second window 32. For example, the first portion 58 of the containment region 16 comprises a narrow end 64 and a wide end 66. The terms "narrow" and "wide" are relative terms, meaning the narrow end 64 is narrower, or has a smaller width or diameter, than the wide end 66. Such a tapered containment region 16 can help to maintain alignment of the interface 52 between the first liquid 58 and the second liquid 50 along the optical axis 22. In other embodiments, the containment region 16 is tapered such that the cross-sectional area of the containment region 16 increases along the optical axis 22 in the direction from the first window 26 to the second window 32 or non-tapered such that the cross-sectional area of the containment region 16 remains substantially constant along the optical axis 22.

In embodiments, the electromagnetic radiation 47 (e.g., one or more of visible light, ultraviolet light, and infrared radiation) enters the liquid lens 10 through the first window 26, is refracted at the interface 52 between the first liquid 48 and the second liquid 50, and exits the liquid lens 10 through the second window 32. In embodiments, as explained, the first substrate 30 and the second substrate 36 are sufficiently transparent to enable passage of the desired wavelengths of electromagnetic radiation 47. Desired wavelengths of the electromagnetic radiation 47 exiting the second window 38 can be sensed by a sensor (not illustrated).

In some embodiments, either or both of an outer surface 68 of the first substrate 30 and an outer surface 70 of the second substrate 36 are substantially planar. Thus, because the liquid lens 10 can function as a lens (e.g., by refracting the electromagnetic radiation 46 passing through interface 52), the outer surfaces 68, 70 of the liquid lens 10 can be flat as opposed to being curved like outer surfaces of a fixed lens. In other embodiments, either or both of the outer surfaces 68, 70 are curved (e.g., concave or convex).

In embodiments, the liquid lens 10 includes a power source connected to the first electrode 20 and the second electrode 24. In embodiments, although not shown, the first electrode 20 is connected to a ground by a first lead while the second electrode 24 is connected to the power supply by a second lead. In embodiments, although not shown, the first electrode 20 is connected to the power supply by a first lead while the second electrode 24 is connected to a ground by a second lead. As used herein, ground refers to a connection to earth or another large reservoir of charge such as a large conductive body. As used herein, a power source is any device capable of creating an electric potential difference. In embodiments, the electric potential difference is within a range of approximately from 0V to 120V, such as from 25V to 70V.

Application of an electrical potential difference between the first electrode 20 and the second electrode 24 from the power source can change the shape of the lens formed by the interface 52 between the first liquid 48 and the second liquid 50. Without wishing to be bound by theory, the lens formed by the interface 52 between the first liquid 48 and the second liquid 50 may be adjusted using the electrowetting phenomena by adjusting the applied potential difference between the first electrode 20 and the second electrode 24. In embodiments, adjusting the applied voltage changes the focal length of the lens. For example, such a change of focal length can enable liquid lens 10 to perform an autofocus function. As used herein, the optical power of a lens is measured using diopters, which is a reciprocal of a focal length of a lens. In some embodiments, the optical power may be adjusted by about 0.25 diopters (D) or more, about 1 D or more, about 2 D or more, about 5 D or more, about 40 D or less, about 30 D or less, about 20 D or less or about 10 D or less. In some embodiments, the optical power of the lens may be adjustable in a range from about −20 D to about 20 D, from about −15 D to about 15 D, from about −10 D to about 10 D, from about −5 D to about 5 D, from about −2 D to about 2 D, from about 0 D to about 20 D, from about 0 D to about 10 D, from about 0 D to about 5 D, from about 0 D to about 2 D, or any range or subrange therebetween.

Additionally, or alternatively, application of an electrical potential difference between the first electrode 20 and the second electrode 24 from the power source tilts the interface 52 relative to an optical axis 22 of the liquid lens 10. Such tilting can enable the liquid lens 10 to perform an optical image stabilization ("OIS") function. Adjusting the interface 52 (e.g., tilting, changing the shape of) can be achieved without physical movement of the liquid lens 10 relative to an image sensor, a fixed lens or lens stack, a housing, or other components of a camera module or other module in which the liquid lens 10 can be incorporated. In embodiments, alternating current electrical power is applied to the driving electrode 34 to manipulate the interface 52 between the first liquid 48 and the second liquid 50.

The First Liquid 48

In embodiments, the first liquid 48 is a non-conductive liquid. In embodiments, the first liquid 48 is a non-polar liquid. As used herein, the term "non-conductive fluid" refers to a liquid having a conductivity of less than approximately $1\times10^{-8}$ S/m, less than approximately $1\times10^{-10}$ S/m, or less than approximately $1\times10^{-14}$ S/m.

The first liquid 48 includes a polyfluoroaromatic compound represented by formula (I) below $$F_x\text{-(aromatic)-Y—}R_1 \qquad \text{(I)}$$

where x is within a range of from 2 to 5; where Y is any organic or inorganic fragment; and where $R_1$ is any organic group. "Aromatic" here means any six carbon aromatic ring (e.g., benzene and derivatives). The Fx, where x is within a range of from 2 to 5, means that the aromatic ring has a degree of fluorination of from 2 to 5 (e.g, there are from 2 to 5 fluorine atoms bound to the carbons of the six carbon aromatic ring).

In embodiments, Y is chosen from the group consisting of $CH_2$, $Si(Alk)_2$, $Ge(Alk)_2$, O, and S. In embodiments, $R_1$ is chosen from the group consisting of a linear aliphatic chain, a cycloaliphatic, a fluorocycloaliphatic, and an aromatic residue. "Alk" as used herein means any aliphatic chain, and can be the same or different as extending from the Si or Ge. The Y and $R_1$ constituents are not limited to those specifically mentioned. In embodiments, Y and $R_1$ are bonded by a double or triple bond.

In embodiments, the first liquid 48 includes a polyfluoroaromatic compound of formula (II) below, which is an example of the polyfluoroaromatic compound of formula (I)

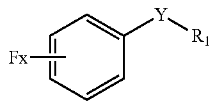
(II)

where x is within a range of from 2 to 5; where Y is any organic or inorganic fragment; and where $R_1$ is any organic group. In embodiments, Y is chosen from the group consisting of $CH_2$, $Si(Alk)_2$, $Ge(Alk)_2$, O, and S. In embodiments, $R_1$ is chosen from the group consisting of a linear aliphatic chain, a cycloaliphatic, a fluorocycloaliphatic, and an aromatic residue. The Y and $R_1$ constituents are not limited to those specifically mentioned. In embodiments, Y and $R_1$ are bonded by a double or triple bond.

In embodiments, the first liquid 48 includes a polyfluoroaromatic compound of formula (III) below, which is another example of the polyfluoroaromatic compound of formula (I)

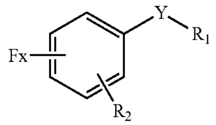
(III)

where x is within a range of from 2 to 4; where Y is any organic or inorganic fragment; where $R_1$ is any organic group; and where $R_2$ is any organic group (and can be the same as or different than $R_1$). In embodiments, Y is chosen from the group consisting of $CH_2$, $Si(Alk)_2$, $Ge(Alk)_2$, O, and S. In embodiments, $R_1$ is chosen from the group consisting of a linear aliphatic chain, a cycloaliphatic, a fluorocycloaliphatic, and an aromatic residue. In embodiments, $R_2$ is an aliphatic group. The Y, $R_1$, and $R_2$ constituents are not limited to those specifically mentioned. In embodiments, Y and $R_1$ are bonded by a double or triple bond.

In embodiments, the first liquid 48 includes butylpentafluorobenzene, which is represented by formula (IV) below

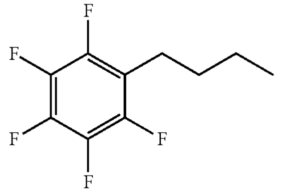
(IV)

Butylpentafluorobenzene is an example, in terms of formulas (I) and (II) above, where Y is $CH_2$.

In embodiments, the first liquid 48 includes dimethylnonafluorohexylpentafluorophenylsilane, which is represented by formula (V) below

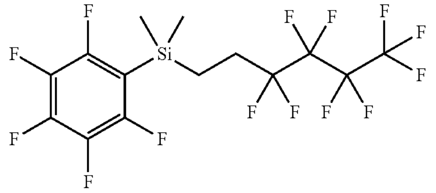
(V)

Dimethylnonafluorohexylpentafluorophenylsilane is an example, in terms of formulas (I) and (II) above, where Y is $Si(Alk)_2$.

In embodiments, the first liquid 48 includes trimethylpentafluorophenylgermane, which is represented by formula (VI) below

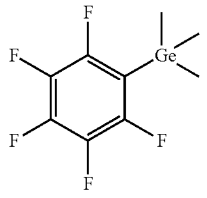
(VI)

Trimethylpentafluorophenylgermane is an example, in terms of formulas (I) and (II) above, where Y is $Ge(Alk)_2$.

In embodiments, the first liquid 48 includes butoxypentafluorobenzene, which is represented by formula (VII) below (VII)

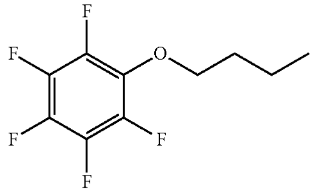

Butoxypentafluorobenzene is an example, in terms of formulas (I) and (II) above, where Y is O (an oxygen atom).

In embodiments, the first liquid 48 includes cyclopentoxypentafluorobenzene, which is represented by formula (VIII) below (VIII)

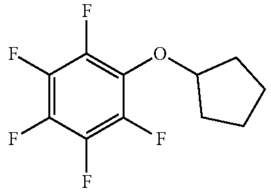

Cyclopentoxypentafluorobenzene is an example, in terms of formulas (I) and (II) above, where Y is O (an oxygen atom).

In embodiments, the first liquid 48 includes 1-n-octyloxypentafluorobenzene, which is represented by formula (IX) below (IX)

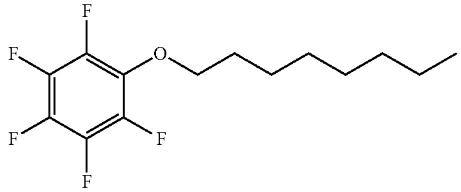

1-n-octyloxypentafluorobenzene is an example, in terms of formulas (I) and (II) above, where Y is O (an oxygen atom).

In embodiments, the first liquid 48 includes cyclooctyloxypentafluorobenzene, which is represented by formula (X) below (X)

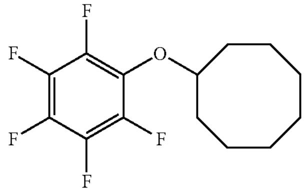

Cyclooctyloxypentafluorobenzene is an example, in terms of formulas (I) and (II) above, where Y is O (an oxygen atom).

In embodiments, the first liquid 48 includes 1-n-dodecyloxypentafluorobenzene, which is represented by formula (XI) below (XI)

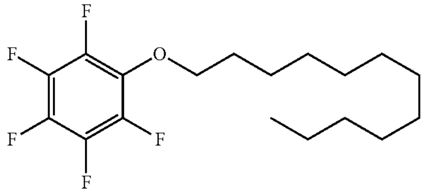

1-n-dodecyloxypentafluorobenzene is an example, in terms of formulas (I) and (II) above, where Y is O (an oxygen atom).

In embodiments, the first liquid 48 includes cyclopentylpentafluorophenylsulfide, which is represented by formula (XII) below (XII)

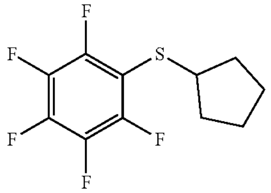

Cyclopentylpentafluorophenylsulfide is an example, in terms of formulas (I) and (II) above, where Y is S (a Sulphur atom).

In embodiments, the first liquid 48 includes phenoxypentafluorobenzene, which is represented by formula (XIII) below (XIII)

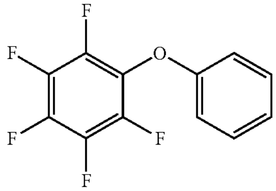

Phenoxypentafluorobenzene is an example, in terms of formulas (I) and (II) above, where Y is O (an oxygen atom).

In embodiments, the first liquid 48 includes 2,4-difluoroanisole, which is represented by formula (XIV) below (XIV)

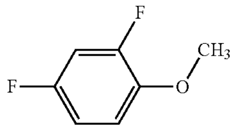

2,4-difluoroanisole is an example, in terms of formulas (I) and (II) above, where Y is O (an oxygen atom).

In embodiments, the first liquid 48 includes heptafluoropentyloxypentafluorobenzene, which is represented by formula (XV) below (XV)

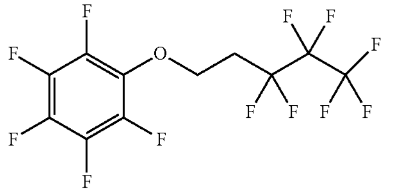

Heptafluoropentyloxypentafluorobenzene is an example, in terms of formulas (I) and (II) above, where Y is O (an oxygen atom).

In embodiments, the first liquid 48 includes a mixture of more than one polyfluoroaromatic compound of the present disclosure, such as more than one of the polyfluoroaromatic compounds represented by formula (IV)-(XV) above.

Table 1 below sets forth selected properties of the polyfluoroaromatic compounds of formulas (IV)-(XV).

TABLE 1

| Compound | ρ (g/mL, @ 20° C.) | n (@ 589 nm, 20° C.) | v (cSt, @ 20° C.) | V (@ 20° C. | CTE ($kg/m^3K$) |
|---|---|---|---|---|---|
| Butylpentafluorobenzene (IV) | 1.2594 | 1.4209 | 1.3 | 43.5 | 1.28 |
| Dimethylnonafluorohexylpentafluorophenylsilane (V) | 1.5195 | 1.389 | 4.3 | 49.1 | 1.5 |
| Trimethylpentafluorophenylgermane (VI) | 1.4387 | 1.447 | 1 | | 14 |
| Butoxypentafluorobenzene (VII) | 1.2934 | 1.4193 | 1.2 | 43.4 | 1.3 |
| Cyclopentoxypentafluorobenzene (VIII) | 1.3580 | 1.4460 | 2.0 | 43.3 | 1.26 |
| 1-n-octyloxypentafluorobenzene (IX) | 1.1733 | 1.4322 | 2.7 | 46.3 | 1.06 |
| Cyclooctyloxypentafluorobenzene (X) | 1.2843 | 1.4635 | 6.8 | 45.1 | 1.06 |
| 1-n-dodecyloxypentafluorobenzene (XI) | 1.1056 | 1.4409 | 5.7 | 48.2 | 0.94 |
| Cyclopentylpentafluorophenylsulfide (XII) | 1.4083 | 1.4983 | 3.9 | 35.9 | 1.2 |
| Phenoxypentafluorobenzene (XIII) | 1.4430 | 1.4845 | 2.7 | 32.3 | 1.3 |
| 2,4 Difluoroanisole (XIV) | 1.1284 | 1.4704 | 1.2 | 33.7 | |
| Heptafluoropentyloxypentafluorobenzene (XV) | | 1.3697 | | 50.9 | |

In Table 1 above, "ρ" means density, "n" means index of refraction, "v" means the kinematic viscosity, "V" means the Abbe number, and "CTE" means the coefficient of thermal expansion. Again, the polyfluoroaromatic compounds represented by formulas (IV)-(XV) are examples of compounds more broadly represented by formulas (I) and (II), and are not meant to limit the scope of polyfluoroaromatic compounds more broadly represented by formulas (I)-(III) and that can be included as a constituent of the first liquid 48.

As Table 1 above demonstrates, the exemplary polyfluoroaromatic compounds of the present disclosure may include a desirable, relatively low, refractive index (e.g. within a range of from 1.35 to 1.50) while also having a desirable, relatively high, density (e.g. within a range of from 1.1 g/mL to 1.5 g/mL), or molecular weight. Without being bound by theory, it is believed that variation in these properties is a result of specifically tailoring the degree of flouronation (the value of x in $F_x$) of the six carbon aromatic ring, as well as specifically tailoring the Y fragment and the R group on the polyfluoroaromatic ring. In some examples, modulating the R group provides for tuning the refractive index and viscosity of the first liquid 48 to a desirable amount.

As alluded to above, the polyfluoroaromatic compounds described herein have demonstrated several physical attributes that are especially beneficial to the application of making liquid lenses or electrowetting optical devices. First, the density of the polyfluoroaromatic compounds of the present disclosure is tunable. Providing fluorination in degrees of two or more provides one mechanism for tuning of the density of the polyfluoroaromatic compound and, thus, the density of the first liquid 48 of which the polyfluoroaromatic compound is a component. The density of the polyfluoroaromatic compound of formulas (I)-(III) increases as the value of x in $F_x$ increases. In embodiments, the density of the polyfluoroaromatic compounds of the present disclosure is 1.1 g/mL, 1.2 g/mL, 1.3 g/mL, 1.4 g/mL, 1.5 g/mL, or within any range bound by any two of those values (e.g., from 1.1 g/mL to 1.5 g/mL, 1.2 g/mL to 1.4 g/mL, and so on). In embodiments, the density of the polyfluoroaromatic compounds of the present disclosure is greater than 1.1 g/mL, greater than 1.2 g/mL, greater than 1.3 g/mL, or greater than 1.4 g/mL. All density values described herein are at 20° C.

Second, the hydrophobicity of the polyfluoroaromatic compounds of the present disclosure is tunable. Thus, the degree of immiscibility of the first liquid 48 (of which the polyfluoroaromatic compound is a component) in the second liquid 50 is tunable. As mentioned above, the first liquid 48 and the second liquid 50 are to be immiscible. As the degree of fluorination of the polyfluoroaromatic compounds of the present disclosure increases, the hydrophobicity of the polyfluoroaromatic compounds increases and, thus, the miscibility of the first liquid 48 with the second liquid 50 decreases. In embodiments, the first liquid 48 has a solubility within water of less than approximately 2 g/100 ml at 22-25° C., such as about 0.5 g/100 ml at 22-25° C.

Third, the polyfluoroaromatic compounds of the present disclosure are highly miscible with many different categories of hydrophobic compounds. Formulating the first liquid 48 to have the above properties, as well as a beneficial boiling point, surface energy, coefficient of thermal expansion (CTE), among others, and matching the density of the second liquid 50, can be difficult. Consequently, the first liquid 48 can be a mixture of one or more other substances in addition to the polyfluoroaromatic compounds of the present disclosure. The polyfluoroaromatic compounds of the present disclosure, as stated, are highly miscible with many different categories of hydrophobic compounds that, together, can form the first liquid 48.

In that regard, in embodiments, in addition to one or more of the polyfluoroaromatic compounds of the present disclosure, the first liquid 48 further includes one or more inorganic liquids (e.g., silicone oil), one or more alkanes (e.g., hexane, heptane, octane, nonane, decane, dodecane), one or more aromatic compounds (e.g., benzene, toluene, diphenyldimethylsilane, 2-(ethylthio)benzothiazole, 1-choloronaphtalene, thianaphtene, 4-bromodiphenyl ether, 1-phenylnaphtalene, 2,5,-dibromotoluene, phenyl sulfide), one or more other fluorinated hydrocarbons that do not satisfy formulas (I)-(III) above, one or more fluorinated silicones, one or more organogermanium compounds (e.g., tetramethylgermane, tetraethylgermane, hexamethyldigermane, hexaethyldigermane, diphenyldimethylgermane, phenyltrimethylgermane), or combinations thereof. It should be understood that the first liquid 48 can be entirely composed of one or more polyfluoroaromatic compounds of the present disclosure.

Further, the polyfluoroaromatic compounds of the present disclosure are relatively inexpensive to formulate, have a desirable index of refraction, and have a high hydrolytic stability.

In embodiments, the first liquid 48 has a viscosity in a range of approximately 0.5 centistokes (cSt) to 5.0 centistokes (at 20° C.), such as from 0.5 cSt to 5.0 cSt (at 20° C.). In embodiments, the first liquid 48 has a refractive index in a range of from 1.38 to 1.75 (at 589 nm and 20° C.).

In embodiments, the first liquid 46 has a density of 0.95 g/mL, 1.00 g/mL, 1.05 g/mL, 1.10 g/mL, 1.15 g/mL, 1.20 g/mL, 1.25 g/mL, 1.30 g/mL, or 1.35 g/mL, or within any range bound by any two of those values (e.g., from 0.95 g/mL to 1.35 g/mL, 1.10 g/mL to 1.30 g/mL, and so on).

The optical quality of the liquid lens 10 can be specified by a Wave Front Error (WFE). The WFE characterizes the deviation of the actual shape of the liquid lens 10 compared to a perfectly spherical lens and is measured as a root-means-squared (RMS) in nanometers.

One significant physical parameter for the liquid lens 10 is a "contact angle" value. When the liquid lens 10 is actuating the interface 52 between the first liquid 48 and the second liquid 50, the angle between the first liquid 48 (non-conducting) surrounded by the second liquid 50 (conducting) and the insulating layer 54 can be characterized and referred to as the "contact angle". The "contact angle" is voltage dependent.

In addition to WFE, optical quality of the liquid lens 10 can be defined by a contact angle hysteresis (e.g. at the interface 52). The contact angle hysteresis may be defined as a differential in measured contact angles of the first liquid 48 with the insulating layer 54 at a given voltage upon increasing an electric potential difference to the first electrode 20 and the second electrode 24 and then decreasing the electric potential difference (e.g., a voltage ramp up from 0V to a maximum driving voltage, followed by voltage ramp down back to 0V). Stated another way, the contact angle hysteresis may be defined by the difference of the contact angle value observed for a given voltage value during an up ramp and the value observed for the same voltage during a down ramp. In some examples, the initial contact angle without voltage may include a maximum of approximately 25° and may increase due to the electrowetting effect to approximately 100° or more at "the maximum driving voltage." In some examples, the maximum driving voltage may provide an AC 1 kHz voltage. The first liquid 48 and the second liquid 50 may have an optical index difference. Thus, the contact angle hysteresis can be measured as an optical hysteresis by comparing the optical power (e.g., in diopters) or focal distance (e.g., in meters) of the liquid lens 10 at increasing voltage to the optical power or focal distance of the liquid lens 20 at the same decreasing voltage.

During operation of the liquid lens 10, properties of the liquid lens 10 and its components can change, which affects the reliability of the liquid lens 10. For example, dielectric properties of the first liquid 48, the second liquid 50, and/or the insulating layer 54 can change in response to exposure to the voltage differential over time, changes in temperature, and other factors. Further, the surface energy of the insulating layer 54 can change in response to exposure to the first liquid 48 and the second liquid 50 over time. These deviations in properties of the liquid lens 10 can degrade the reliability and performance characteristics of the liquid lens 10 (e.g. the optical quality, or stability, of the liquid lens 10 can be affected).

Reliability can be one of most difficult aspects to obtain in the design of a liquid lens. Most of the reliability tests are based on exposing the liquid lens (e.g., the liquid lens 10) to high or low temperature, voltage, acceleration, electromagnetic radiation or combinations thereof. Typically, liquid lenses (e.g. liquid lens 10) are measured before and after exposure to the reliability test and the key parameters (WFE, hysteresis, etc.) are compared. A significant increase in WFE and hysteresis is undesirable.

Because the second liquid 50 typically contains water, glycols or ionic liquids, the second liquid 50 may contain a significant concentration of nucleophilic species. As such, compounds present in the first liquid 48 should not be structures sensitive to nucleophilic species. For example, structures with a low hydrolytic stability are not desirable. Chemical evolution of the first liquid 48 during a reliability test may lead to an increase in hysteresis.

In that regard, the first liquid 48, including the polyfluoroaromatic compounds of the present disclosure, imparts the liquid lens 10 with beneficial properties. As the C—F bonds in the compositions of formula (I) are much stronger than C—Cl or C—Br bonds, the fluoroaromatic structures including at least two fluorine substituents as described herein should have improved hydrolytic stability when compared to other halogenated structures, which do not include at least two fluorine substituents. Further, the Y fragment of formulas (I)-(III) above can be selected to impart a high hydrolytic stability (e.g. highly resistant to hydrolysis). In embodiments, the liquid lens 10 including the first liquid 48 as described exhibits a hysteresis that increases from an initial hysteresis by less than 1 diopter after being stored at 85° C. for at least 120 hours.

As further revealed in the Examples below, the polyfluoroaromatic compounds of the present disclosure are relatively inexpensive to manufacture. The raw materials from which the fluoroaromatic compounds can be made, such as polyfluorobenzene, are readily available.

Further, as mentioned, the first liquid 48 as described herein that includes one or more of the fluoroaromatic compounds of the present disclosure is compatible with the second liquid 50 that is substantially free of water. That is advantageous because many non-conductive liquids utilized in liquid lenses are not compatible with conductive liquids that are substantially free of water.

Referring now to FIG. 2, a method 100 of manufacturing the liquid lens 10 is herein described. At a step 102, the method 100 includes disposing the first liquid 48 into the base 12. At a step 104, the method further includes disposing the second liquid 50 into the base. In embodiments, the step 104 occurs before the step 102. In other embodiments, the step 104 occurs after the step 102. As mentioned, the first liquid 48 and the second liquid 50 are substantially immiscible, and the interface 52 forms between the first liquid and the second liquid 50.

The following examples describe various features and advantages provided by the disclosure, and are in no way intended to limit the invention and appended claims. It is understood that the first liquid 48 may be synthesized according to other processes. It is also understood that the below examples may include additional or alternative steps without deviating from the scope of the present disclosure.

EXAMPLES

Example 1—In Example 1, a liquid lens was formed. The conductive liquid was electrolyte-based, including approximately 93 wt. % ethylene glycol, approximately 3 wt. % water and approximately 4 wt. % potassium acetate. The non-conductive liquid was oil-based, including approximately 35 wt. % phenyltrimethylsilane and approximately 65 wt. % phenoxypentafluorobenzene.

Example 2—In Example 2, another liquid lens was formed. The conductive liquid was electrolyte-based, including approximately 93 wt. % ethylene glycol, approximately 3 wt. % water, and approximately 4 wt. % potassium acetate. The non-conductive liquid was oil-based, including approximately 15 wt. % diphenyldimethysilane, approximately 25 wt. % n-octyltris(trimethylsiloxy)silane, and approximately 60 wt. % cyclopentylpentafluorophenylsulfide.

Example 3—In Example 3, a liquid lens was formed. The conductive liquid was electrolyte-based, including approximately 90 wt. % 1-ethyl-3-methylimidazolium dicyanamide and approximately 10 wt. % propylene carbonate. The non-conductive liquid was oil-based, including approximately 10 wt. % n-octyltris(trimethylsiloxy)silane and approximately 90 wt. % 1-n-octyloxypentafluorobenzene.

Example 4—In Example 4, a non-conductive liquid suitable for a liquid lens was formed that included butylpentafluorobenzene. As an initial step, 85 mL of 2.5 M n-butyllithium was diluted in hexane and 70 mL dry tetrahydrofuran (THF). Then, the solution was slowly added to 40.2 g (0.21 mol) of hexafluorobenzene solution in 230 mL of dry THF and cooled in a dry ice/acetone bath. At the end of the addition, the temperature was maintained at −78° C. for 20 minutes. Next, the reaction was quenched by the addition of 10 mL of water, and then 120 mL of brine. Then, 150 mL of diethyl ether was added and the phases were separated. The remaining product was extracted from the water phase with ether (3×50 mL). The etherous phases were then reassembled, dried over magnesium sulfate and concentrated under reduced pressure. The crude product was distilled to yield two fractions: butylpentafluorobenzene, 28.16 g (12 mmol) (yield 60%) and o-dibutylpentafluorobenzene, 5.94 g (2.2 mmol).

As this example illustrates, butylpentafluorobenzene can be formed by nucleophilic substitution on polyfluorobenzene (e.g., hexafluorobenzene) with an organometallic reactant or by photocatalytic C—F alkylation. Optionally, the nucleophilic substitution could be performed with a Grignard reagent and hexafluorobenzene, and provide a same, or similar, result.

Example 5—In Example 5, a non-conductive liquid suitable for a liquid lens was formed that included dimethylnonafluorohexylpentafluorophenylsilane. As an initial step, 2 mL (3.9 g, 15.8 mmol) of bromopentafluorobenzene was diluted in 200 mL of dry diethyl ether and the solution was placed in an ice bath. Next, 6 mL of 2.5 M n-butyllithium in hexane was slowly added to the bromopentafluorobenzene solution over a duration of 15 minutes. Then 3.7 mL (14.8 mmol) of dimethylnonafluorohexylchlorosilane was added. The mixture was stirred for 1 hour and 30 minutes at room temperature. The reaction was then quenched by the addition of 30 mL of water. Next, 50 mL of ether was added to the solution and the phases were separated. The remaining product was extracted from the water phase with ether (2×40 mL). Then, the etherous phases were reassembled, dried over magnesium sulfate, and concentrated under reduced pressure. The crude product was purified by flash chromatography on silica gel using pentane to yield the expected product as an uncolored, or colorless, oil including 7.7 g of quantitative yield of dimethylnonafluorohexylpentafluorophenylsilane.

Optionally, the same procedure can be used with any chlorosilane or chlorogermane to yield coupling adducts.

Example 6—In Example 6, a non-conductive liquid suitable for a liquid lens was formed that included 1-n-dodecyloxypentafluorobenzene. As an initial step, a suspension of 2.5 mL (27.2 mmol) of potassium hydride was placed in mineral oil under an inert argon atmosphere in a round bottom flask. Next, the suspension was rinsed three times with 10 mL of pentane to remove the initial mineral oil and dispersed in 25 mL of dry THF. Then, 3.9 mL (33.5 mmol) of hexafluorobenzene was added, and the mixture was placed in an ice bath. Next, 5 mL (22.3 mmol) of dodecanol was added, dropwise. After the end of the addition, the mixture was kept in the ice bath for 30 minutes, and then placed at room temperature. After 1 hour and 30 minutes, the reaction was quenched by the addition of 30 mL water. Then, 60 mL of ether was added and the phases were separated. The remaining product was extracted from the water phase with ether (2×60 mL). Then, the etherous phases were reassembled, dried over magnesium sulfate and concentrated under reduced pressure. The crude product was purified by flash chromatography on silica gel using pentane to yield the expected product of 1-n-dodecyloxypentafluorobenzene as a colorless oil of 4.57 g (yield 58%).

This example illustrates the nucleophilic substitution of a fluorine anion on polyfluorobenzene by an alcoolate, and the formation of a carbon-oxygen bond from hexafluorobenzene to synthesize 1-n-dodecyloxypentafluorobenzene.

Example 7—In Example 7, a non-conductive liquid suitable for a liquid lens was formed that included cyclopentylpentafluorophenylsulfide. As an initial step, 10 mL of cyclohexane, 1.2 mL (8.95 mmol) of pentafluorothiophenol, and 0.68 mL (7.45 mmol) of cyclopentene were added to a culture tube and stirred under argon. Next, 10 mg (0.0373 mmol) of photocatalyst represented by formula (XVI), below, was added.

(XVI)

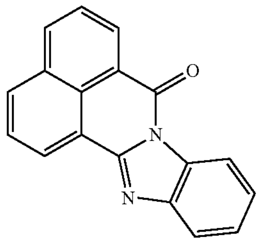

The culture tube was then sealed and placed in a closed box fitted with blue LEDs and a cold water bath (5° C.). The mixture was irradiated and stirred at room temperature for 48 hours. Then water and diethyl ether were added. Next, the layers were separated and the organic phase was washed with a saturated solution of $NaHCO_3$ (2×20 mL). The ethereal phase was collected, dried over magnesium sulfate, and filtered and reduced under vacuum to give a yellow liquid. The crude product was then purified on a spherical silica gel using pentane to yield the expected product as a colorless liquid of 1.49 g (yield 74%) of cyclopentylpentafluorophenylsulfide.

This example illustrates the photocatalyzed addition of a fluorinated thiophenol (pentafluorothiophenol) on an alkene to synthesize cyclopentylpentafluorophenylsulfide.

It will be apparent to those skilled in the art that various modifications and variations can be made without departing from the spirit or scope of the claims.

What is claimed is:

1. A liquid lens comprising:

a first liquid comprising a polyfluoroaromatic compound represented by formula (I)

$$F_x\text{-(aromatic)-}Y\text{—}R_1 \qquad \text{(I)}$$

where x is within a range of from 2 to 5; where Y is chosen from the group consisting of $CH_2$, $Si(Alk)_2$, $Ge(Alk)_2$, O, and S, where "Alk" is a linear aliphatic chain; where $R_1$ is any organic group, and "aromatic" is any six carbon aromatic ring;

a second liquid, wherein the first liquid and the second liquid (i) form an interface between the first liquid and the second liquid and (ii) comprise a miscibility of less than 2% over a temperature range of from −30° C. to 85° C.; and wherein the first liquid comprises a density in a range of from 0.95 g/mL to 1.35 g/mL (at 20° C.).

2. The liquid lens of claim 1, wherein $R_1$ is chosen from the group consisting of a linear aliphatic chain, a cycloaliphatic, a fluorocycloaliphatic, and an aromatic residue.

3. The liquid lens of claim 1, wherein the $F_x$-(aromatic) portion of formula (I) is a fluorobenzene ring.

4. The liquid lens of claim 1, wherein the $F_x$-(aromatic) portion of formula (I) is a pentafluorobenzene ring including five fluorine substituents.

5. The liquid lens of claim 1, wherein the polyfluoroaromatic compound is represented by formula (II) below (II)

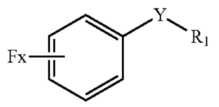

where x is within a range of from 2 to 5; where Y is chosen from the group consisting of $CH_2$, $Si(Alk)_2$, $Ge(Alk)_2$, O, and S, where "alk" is a linear aliphatic chain; and where $R_1$ is chosen from the group consisting of a linear aliphatic chain, a cycloaliphatic, a fluorocycloaliphatic, and an aromatic residue.

6. The liquid lens of claim 1, wherein the polyfluoroaromatic compound is represented by formula (III) below (III)

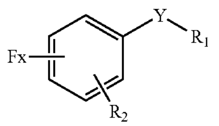

where x is within a range of from 2 to 4; where Y is any organic or inorganic fragment;

where $R_1$ is any organic group; and where $R_2$ is any organic group.

7. The liquid lens of claim 1, wherein the second liquid is substantially free of water.

8. A liquid lens comprising:

a first liquid comprising a polyfluoroaromatic compound represented by formula (I) below $$F_x\text{-(aromatic)-}Y\text{—}R_1 \qquad \text{(I)}$$

where x is within a range of from 2 to 5; where Y is chosen from the group consisting of $CH_2$, $Si(Alk)_2$, $Ge(Alk)_2$, O, and S, where "Alk" is a linear aliphatic chain; where $R_1$ is any organic group, and "aromatic" is any six carbon aromatic ring; and a second liquid, wherein the first liquid and the second liquid (i) form an interface between the first liquid and the second liquid, (ii) comprise a miscibility of less than 2% over a temperature range of from −30° C. to 85° C., and (iii) each comprise a density, the densities differing by less than 0.1 g/mL.

9. The liquid lens of claim 8, wherein the $R_1$ is chosen from the group consisting of a linear aliphatic chain, a cycloaliphatic, a fluorocycloaliphatic, and an aromatic residue.

10. The liquid lens of claim 8, wherein the $F_x$-(aromatic) portion of formula (I) is a fluorobenzene ring.

11. The liquid lens of claim 8, wherein the $F_x$-(aromatic) portion of formula (I) is a pentafluorobenzene ring including five fluorine substituents.

12. The liquid lens of claim 8, wherein the polyfluoroaromatic compound is represented by formula (II) below (II)

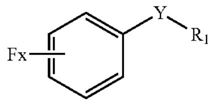

where x is within a range of from 2 to 5; where Y is chosen from the group consisting of $CH_2$, $Si(Alk)_2$, $Ge(Alk)_2$, O, and S, where "alk" is a linear aliphatic chain; and where $R_1$ is chosen from the group consisting of a linear aliphatic chain, a cycloaliphatic, a fluorocycloaliphatic, and an aromatic residue.

13. The liquid lens of claim 8, wherein the polyfluoroaromatic compound is chosen from the group consisting of:

butylpentafluorobenzene;
dimethylnonafluorohexylpentafluorophenylsilane;
trimethylpentafluorophenylgermane;
butoxypentafluorobenzene;
cyclopentoxypentafluorobenzene;
1-n-octyloxypentafluorobenzene;
cyclooctyloxypentafluorobenzene;
1-n-dodecyloxypentafluorobenzene;
cyclopentylpentafluorophenylsulfide;
phenoxypentafluorobenzene;
2,4-difluoroanisole; and
heptafluoropentyloxypentafluorobenzene.

14. The liquid lens of claim 8, wherein the polyfluoroaromatic compound is represented by formula (III) below (III)

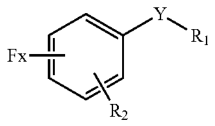

where x is within a range of from 2 to 4; where Y is any organic or inorganic fragment;

where $R_1$ is any organic group; and where $R_2$ is any organic group.

15. The liquid lens of claim 8, wherein the first liquid comprises a density in a range of from 0.95 g/mL to 1.35 g/mL (at 20° C.); and the second liquid is water-based, glycol-based, or ionic liquid-based.

16. The liquid lens of claim 8, wherein the second liquid is substantially free of water.

17. A method of manufacturing a liquid lens comprising:

disposing a first liquid into a base, the first liquid comprising a polyfluoroaromatic compound represented by formula (I) below $$F_x\text{-(aromatic)-}Y\text{—}R_1 \quad \text{(I)}$$

where x is within a range of from 2 to 5; where Y is chosen from the group consisting of $CH_2$, $Si(Alk)_2$, $Ge(Alk)_2$, O, and S, where "Alk" is a linear aliphatic chain; where $R_1$ is any organic group, and "aromatic" is any six carbon aromatic ring; and disposing a second liquid into the base, wherein the first liquid and the second liquid (i) form an interface between the first liquid and the second liquid and (ii) comprise a miscibility of less than 2% over a temperature range of from −30° C. to 85° C.;

wherein the first liquid comprises a density in a range of from 0.95 g/mL to 1.35 g/mL (at 20° C.);

wherein, a difference between the density of the first liquid and a density of the second liquid is less than 0.1 g/mL; and wherein a difference between a refractive index of the first liquid and a refractive index of the second liquid is in a range of from 0.02 to 0.24.

18. The method of claim 17, wherein the $F_x$-(aromatic) portion of formula (I) is a fluorobenzene ring; and the second liquid is substantially free of water.

* * * * *